United States Patent [19]

Hamada et al.

[11] Patent Number: 4,706,173

[45] Date of Patent: Nov. 10, 1987

[54] LIGHTING APPARATUS

[75] Inventors: Hiroshi Hamada, Yamatokoriyama; Kiyoshi Nakazawa, Fujiidera; Hiroshi Take, Ikoma; Naofumi Kimura, Nara; Fumiaki Funada, Yamatokoriyama, all of Japan

[73] Assignee: Sharp Kabushiki Kaisha, Osaka, Japan

[21] Appl. No.: 831,258

[22] Filed: Feb. 20, 1986

[30] Foreign Application Priority Data

Feb. 22, 1985 [JP] Japan .................................. 60-35003
Jun. 28, 1985 [JP] Japan ................................ 60-142751

[51] Int. Cl.$^4$ ............................................. F21V 7/00
[52] U.S. Cl. ...................................... 362/341; 362/346
[58] Field of Search ............... 362/341, 346, 34, 348, 362/350, 342, 343, 297, 298, 301, 347, 349; 355/71, 65, 66, 67; 350/292

[56] References Cited

U.S. PATENT DOCUMENTS

| | | | |
|---|---|---|---|
| 1,950,560 | 3/1934 | Martinek et al. .................... | 362/341 |
| 2,115,906 | 5/1938 | Dickson et al. ..................... | 362/341 |
| 2,280,640 | 4/1942 | Shockey .............................. | 362/341 |
| 2,287,191 | 6/1942 | Morehead ........................... | 362/341 |
| 2,380,447 | 7/1945 | Jurgerson ........................... | 362/341 |
| 3,894,228 | 7/1975 | Cobb, Jr. ............................ | 362/341 |
| 4,351,019 | 9/1982 | Avery et al. ........................ | 362/346 |
| 4,475,791 | 10/1984 | Nixon ................................. | 362/346 |

Primary Examiner—Raymond A. Nelli
Attorney, Agent, or Firm—Birch, Stewart, Kolasch & Birch

[57] ABSTRACT

A lighting apparatus including a tubular light source and a member having a plurality of reflective surfaces which are angularly set such that light from the light source is reflected in a predetermined direction of a viewing angle by each of the reflective surfaces. A ratio of an apparent width of each of the reflective surfaces to an apparent interval of adjacent ones of the reflective surfaces, when viewed from the predetermined direction of the viewing angle, is so set as to be a function of a distance between the light source and each of the reflective surfaces.

10 Claims, 22 Drawing Figures

LIGHTING APPARATUS

BACKGROUND OF THE INVENTION

The present invention generally relaing apparatuses for passive type display unparticularly, to a lighting apparatus which employs a light guide used in a back light for a liquid crystal display (LCD).

Generally, display units can be classified into active (luminous) type display units and passive (nonluminous) type display units. The active type display units are display units arranged to perform display by emitting light by themselves and include a light emitting diode display, a plasma display, an electroluminescent display, etc. On the other hand, the passive type display units are display units arranged to perform pattern display by modulating ambient light or irradiated light from other light sources through control of transmittance or reflectance of light without emitting light by themselves and include a liquid crystal display (LCD), an electrochromic display, etc. Accordingly, the passive type display units have a drawback when they are in a dark environment because their display becomes obscure unless a lighting means is provided.

The LCDs have such features as having small power consumption and being extensively used for portable electronic appliances such as an electronic calculator, an electronic wrist watch, etc. However, in most of the LCDs, since display modes are based on optical anisotropy, polarizing plates are strictly required to be provided so as to be piled on each other and thus, about 50% of irradiated light is absorbed by the polarizing plates. Especially, in an LCD employing a color filter, since intensity of light is further reduced for color display, it becomes indispensably necessary to provide the LCD with a lighting means for enabling indoor general use of the LCD. In the portable electronic appliances, since a power source is restricted in capacity, such a problem arises in manufacture of the LCDs that it is necessary to obtain a lighting apparatus capable of performing brighter lighting with smaller power consumption.

FIG. 1 shows a prior art back light used as the above described internal light source. The known back light includes a light source 1, a display panel 10, a diffuse transmission plate 4 disposed between the light source 1 and the display panel 10 and a reflector 5. A miniature incandescent lamp or a fluorescent lamp is used as the light source 1. The diffuse transmission plate 4 is made of milky glass or synthetic resin and has an effect of scattering light so as to uniform luminance of an illuminated face over a whole area of the illuminated face. Meanwhile, a reflector having a mirror surface or diffusive reflection surface for scattering light is used as the reflector 5. The reflector 5 is provided for reflecting light emitted rearwardly from the light source 1 so as to introduce the light forwardly such that a utilization factor of the light is improved. However, in the known back light referred to above, the light source 1 and the diffuse transmission plate 4 are required to be spaced a certain distance away from each other in order to lessen non-uniformity of brightness, thereby undesirably increassing depth of the known back light.

Furthermore, an edge light as shown in FIG. 2 has been conventionally used. The prior art edge light includes a light guide 6 and a display panel 10. The light guide 6 has faces A, B and C and the face B is roughly frosted. Light incident, at the face C, upon the light guide 6 from the light source 1 is subjected to diffuse reflection on the face B and then, is irradiated, through the face A, onto the display panel 10 disposed adjacent to the face A. This prior art edge light has such a drawback that luminance of the face B decreaset as a point on the face B is spaced further away form the light source 1.

Referring to FIG. 3, there is shown a known back light. The known back light includes a reflecting mirror 7 having a parabolic reflective surface. It is to be noted that in the case where the light source 1 is of a tubular shape, the reflective surface of the reflecting mirror 7 has a shape of a parabolic cylinder. In the known back light, light reflected on the reflecting mirror 7 constitutes a substantially parallel luminous flux. However, it will be understood from FIG. 3 that the known back light is disadvantageous in that as a point on the reflective surface is spaced further away from the center of the reflective surface, luminous flux density drops. Furthermore, the known back light has such an inconvenience as its large depth.

SUMMARY OF THE INVENTION

Accordingly, an essential object of the present invention is to provide a lighting apparatus in which a light guide is formed into such a special shape that a bright display free from non-uniform illumination can be obtained at a high utilization factor of light, with substantial elimination of the disadvantages inherent in conventional lighting apparatuses of this kind.

The present invention is based on the following principle (1) to (3).

(1) In order to illuminate a display panel uniformly when the display panel is observed from a fixed direction, it is only necessary to make luminance of a back light uniform in the fixed direction but directivity (angular distribution) of light or luminous exitance is not necessarily required to be uniform.

(2) Luminance of a light source, which is measured at the time when the light source is directly observed by an observer, is constant regardless of a distance between the light source and the observer.

(3) Luminance of a mirror image of a light source, which is measured at the time when light from the light source is observed after its reflection on a plane mirror, becomes equal to a product of the luminance of the light source by the reflectance of the plane mirror and does not depend on position of the mirror image of the light source.

In order to accomplish the above described object of the present invention based on principles (1) to (3), a lighting apparatus according to a first embodiment of the present invention includes a tubular light source and a member having a plurality of belt-like reflective surfaces for reflecting light from said light source, the improvement comprising: said reflective surfaces being angularly set such that the light from said light source is reflected in a predetermined direction of a viewing angle by each of said reflective surfaces; adjacent ones of said reflective surfaces, when viewed from the predetermined direction of the viewing angle, being spaced an apparent interval away from each other; each of said reflective surfaces, when viewed from the predetermined direction of the viewing angle, having an apparent width; and a ratio of said apparent width to said apparent interval being so set as to be a function of a distance between said light source and each of said reflective surfaces.

Furthermore, a lighting apparatus according to a second embodiment of the present invention includes a tubular light source and a member having a plurality of belt-like reflective surfaces, the improvement comprising: said reflective surfaces being angularly set such that light from said light source is reflected in a predetermined direction of a viewing angle by each of said reflective surfaces; adjacent ones of said reflective surfaces, when viewed from the predetermined direction of the viewing angle, being spaced an apparent interval away from each other; each of said reflective surfaces, when viewed from the predetermined direction of the viewing angle, having an apparent width; and a ratio of said apparent width to said apparent interval being so set as to be constant.

In the present invention, the predetermined direction of the viewing angle is not necessarily required to be set at a direction perpendicular to the face of the display panel. For example, in the case where a display panel dependent on the viewing angle, e.g., an LCD panel is employed, the predetermined direction of the viewing angle can be set at a direction of an optimum viewing angle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
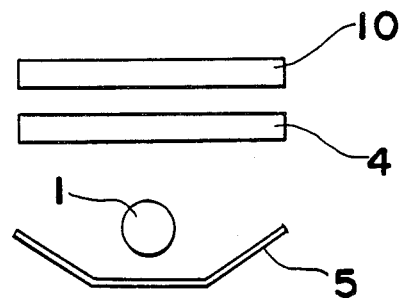
FIGS. 1 to 3 are schematic views of prior art lighting apparatuses, respectively (already referred to)
Figure 2:
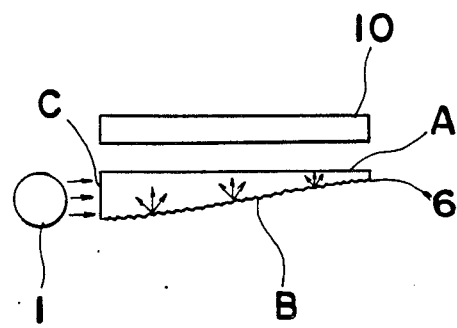
Figure 3:
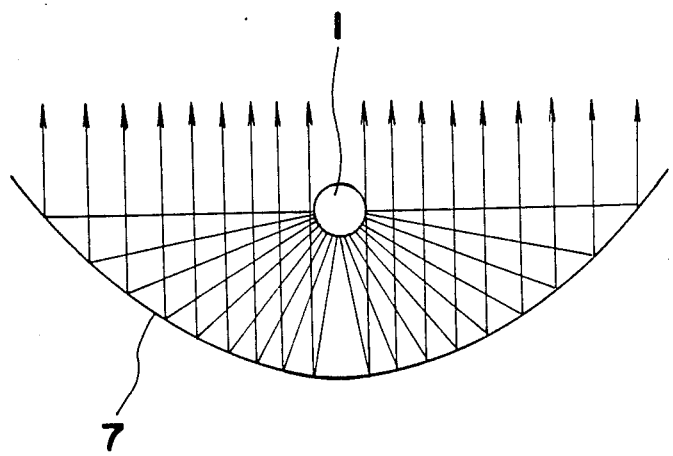
Figure 4:
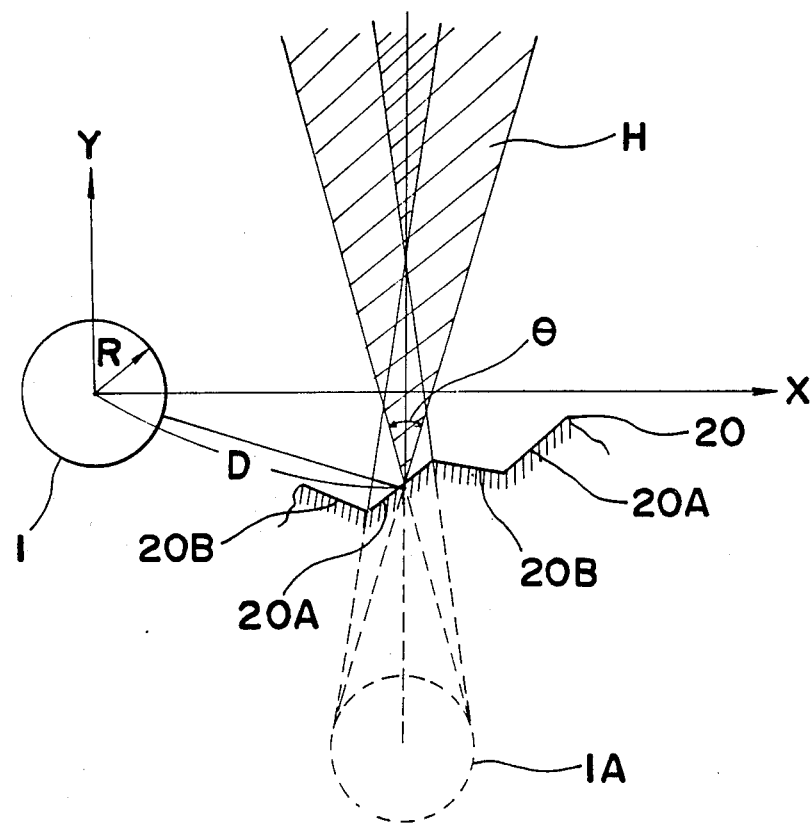
FIG. 4 is a schematic view explanatory of principles of the present invention.
Figure 5:
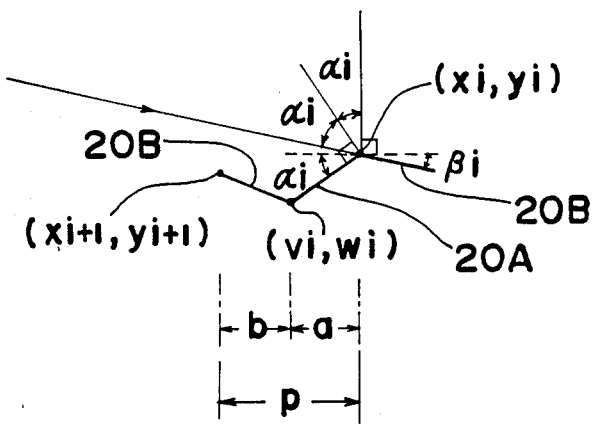
FIG. 5 is a detailed view of FIG. 4.

Hereinbelow, a first embodiment of the present invention will be described with reference to FIGS. 4 to 12. In FIGS. 4 and 5, principles of the present invention are shown. In FIG. 4, a mirror image 1A of a light source 1 is formed by a reflective surface 20A. Light emitted from the mirror image 1A is prevented by the reflective surface 20A from being angularly distributed and thus, proceeds only to a hatching portion H in FIG. 4. When a width of the reflective surface 20A is far smaller than a radius R of the light source 1, a vertical angle $\theta$ formed by the hatching portion H is given by the following equation (1):

$$\theta = 2\sin^{-1}(R/D) \tag{1}$$

where: D=distance between light source 1 and reflective surface 20A.

Figure 10A:
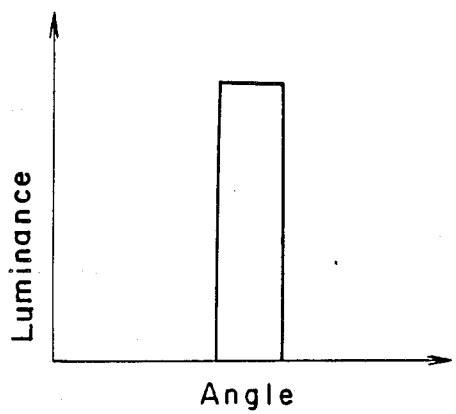
FIGS. 10a, 10b, 11a, 11b, 12a and 12b are graphs indicative of effect of a diffuse plate employed in the lighting apparatus according to the first embodiment of the present invention.
Figure 10B:
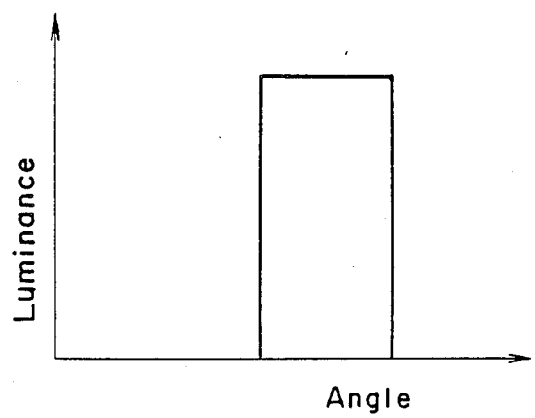
Figure 11A:
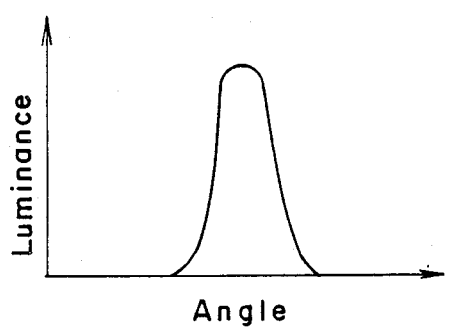
Figure 11B:
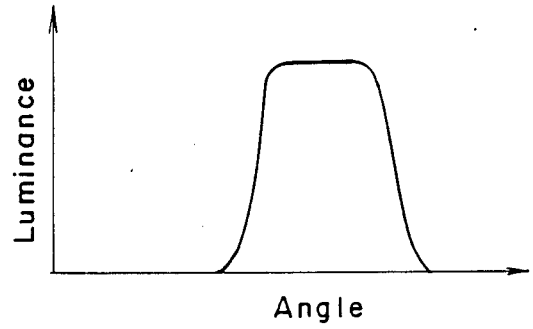
Figure 12A:
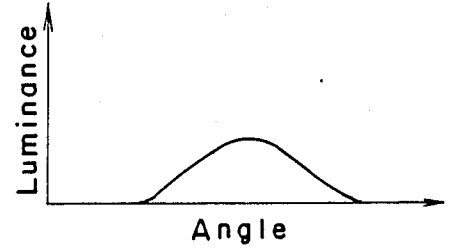
Figure 12B:
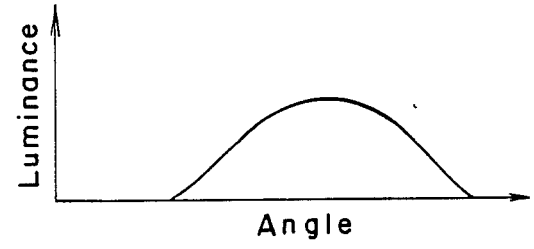
Figure 13:
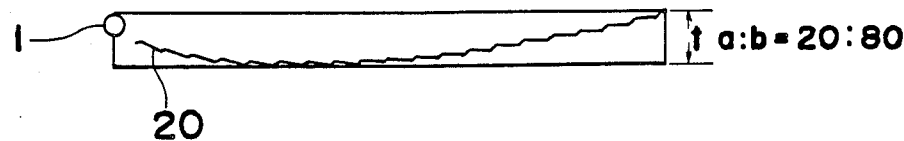
FIGS. 13 to 17 are cross-sectional views of five examples of a reflective surface of a light guide employed in a lighting apparatus according to a second embodiment of the present invention, respectively.
Figure 14:
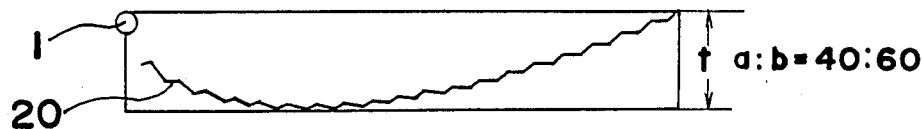
Figure 15:
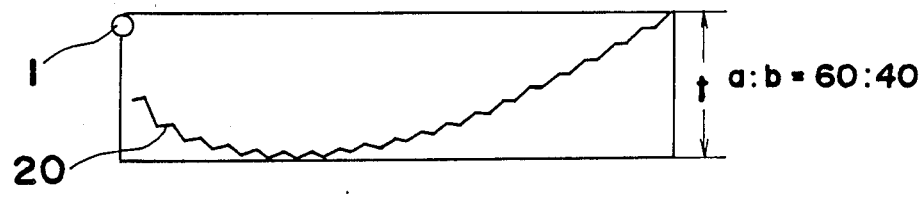
Figure 16:
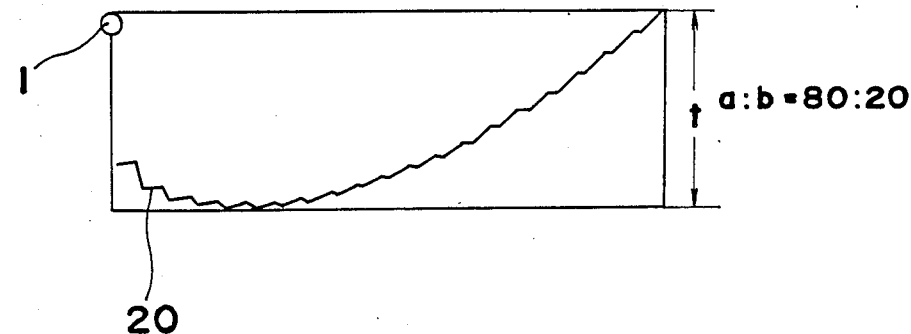
Figure 17:
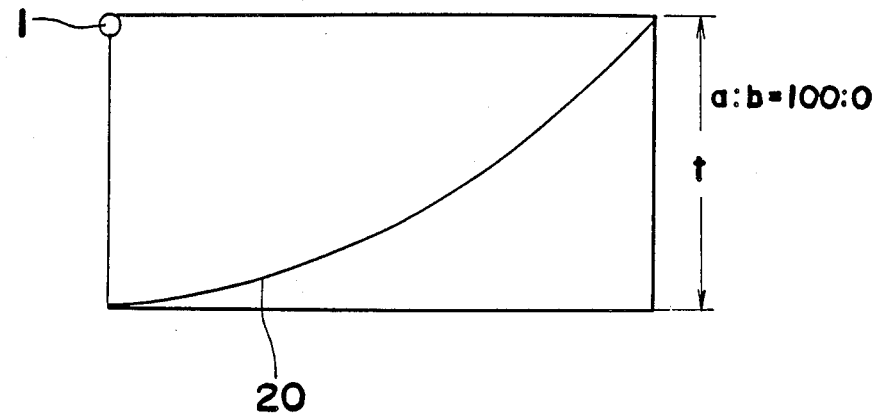

Thus, the reflected light is angularly distributed into a rectangular shape having a width of $2\sin^{-1}(R/D)$ as shown in FIG. 10 illustrating angular distribution of light incident upon a diffusing plate. In FIG. 10a, the distance D is large and the angle $\theta$ is small. Meanwhile, in FIG. 10b, the distance D is small and the angle $\theta$ is large. It is to be noted that FIGS. 10a and 10b correspond to FIGS. 11a and 12a and FIGS. 11b and 12b, respectively. FIG. 11 illustrates angular distribution of diffuse transmission light in the case where a diffusing plate having a small diffusing power is used. On the contrary, FIG. 12 illustrates angular distribution of diffuse transmission light in the case where a diffusing plate having a large diffusing power is used.

Supposing that the angular distribution of the incident light is expressed by $I(\theta)$ and a characteristic of the diffusing plate is expressed by $D(\theta)$, angular distribution $T(\theta)$ of the diffuse transmission light is given by the following equation (2).

$$T(\theta) = \int_{-90°}^{90°} I(\theta - \phi) \cdot D(\phi) \, d\phi \tag{2}$$

In the above equation (2), the characteristic $D(\theta)$ of the diffusing plate represents a ratio of luminous intensity of diffused light oriented in the direction of the angle $\theta$ to luminous intensity of the incident light when parallel light rays are incident upon the diffusing plate at right angles to the diffusing plate.

In the case where diffusing power of the diffusing plate, i.e., a half-width of the ratio $D(\theta)$ is small as compared with a width of angular distribution of the incident light, the maximum luminance does not depend upon the width of the angular distribution of the incident light although the angular distribution of the incident light becomes small only at its opposite ends as shown in FIGS. 11a and 11b.

On the other hand, in the case where a diffusing plate having a large diffusing power is used, the maximum luminance varies according to a total amount of the incident light as shown in FIGS. 12a and 12b.

In the present invention, by varying a ratio of a width a of the reflective surface 20A to an interval p between adjacent ones of the reflective surfaces 20A according to the distance D between the light source 1 and the reflective surface 20A, the above described variations in luminance, which are based on the distance D, are eliminated and compensation for luminance is performed such that luminance observed from a predetermined direction of a viewing angle is made constant.

More specifically, in FIGS. 4 and 5, a light guide 20 includes the reflective surfaces 20A and surfaces 20B. Light emitted from the tubular light source 1 is reflected in a predetermined direction of a viewing angle, i.e., in the upward direction in FIG. 4 by the reflective surface 20A. At this time, the mirror image 1A of the light source 1 is formed at the position shown in FIG. 4. Thus, when the belt-like reflective surface 20A is observed from the hatching portion H, the belt-like reflective surface 20A as a whole will appear shining. Meanwhile, the surfaces 20B are angularly so set as to extend substantially in parallel with the light from the light source 1 or constitute shadow portions of the reflective surfaces 20A. Thus, when the surfaces 20B are observed from a predetermined direction, the surfaces 20B will not appear shining. The surfaces 20B are provided in order to reduce overall thickness of the light guide 20.

When an X-Y coordinate system is established in the light guide 20 as shown in FIG. 4, an X-axis coordinate and a Y-axis coordinate of each edge of the light guide 20 are obtained by the following algorithm. In FIG. 4, the origin of the X-Y coordinate system is set at the tubular light source 1 and a direction of a viewing angle is set at the Y-axis. In FIG. 5, it is assumed that coordinates of opposite ends of an i-th reflective surface 20A (i=natural number) are $(x_i, y_i)$ and $(v_i, w_i)$, respectively. The i-th reflective surface 20A forms an angle $\alpha_i$ with the X-axis, while one surface 20B adjacent to the i-th reflective surface 20A forms an angle $\beta_i$ with the X-axis. The i-th reflective surface 20A and the adjacent surface 20B have lengths a and b in the direction of the X-axis and thus, a pitch p is equal to a sum of the lengths a and b.

When one of the opposite ends of the i-th reflective surface 20A, which is disposed further away from the light source 1 than the other one of the opposite ends of the i-th reflective surface 20A, is set at a starting-point, coordinates of points disposed more adjacent to the light source 1 are sequentially given by the following equations (3).

$$\left.\begin{aligned}
\beta_i &= \arctan(y_i/x_i) \\
\alpha_i &= (90° - \beta_i)/2 \\
v_i &= x_i - a \\
w_i &= y_i - a \tan \alpha_i \\
x_{i+1} &= v_i - b \\
y_{i+1} &= w_i - b \tan \beta_i
\end{aligned}\right\} \quad (3)$$

When the light guide 20 having a shape thus obtained is observed from the predetermined direction of the viewing angle, the light guide 20 will have a striped appearance in which the shining reflective surfaces 20A and the unshining surfaces 20B are arranged alternately. As described earlier, luminance of the reflective surface 20A is constant regardless of the distance between the reflective surface 20A and the light source 1. Meanwhile, an average luminance obtained by calculating an average value of luminances of the bright and dark stripes becomes equal to a product of (a/b) by the luminance of the reflective surface 20A. When the length b is reduced, the average luminance rises but thickness of the light guide 20 also increases. Meanwhile, when the length b is increased, the average luminance drops but thickness of the light guide 20 decreases. Therefore, the ratio of the length a to the length b may be varied according to specific requirements.

Figure 6:
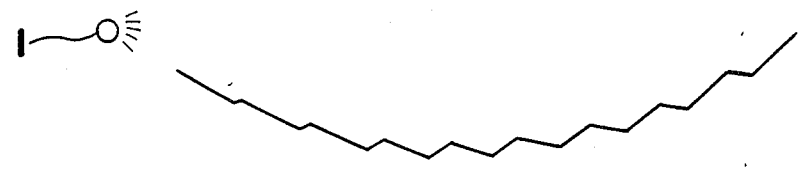
FIGS. 6 and 7 are cross-sectional views of two examples of a belt-like reflective surface of a light guide employed in a lighting apparatus according to a first embodiment of the present invention respectively.

In the present invention, a diffusing plate having a large diffusing power is employed. Thus, the present invention is characterized in that the ratio of the length a to the pitch p, i.e., a value of (a/p) is changed according to the distance D between the light source 1 and the reflective surface 20A. A milky plastic plate having a certain thickness or more exhibits a large diffusing power and thus, can be approximately regarded as a perfect diffuser. Hence, the value of (a/p) is determined as follows. Even if the perfect diffuser is observed from any direction, luminance of the perfect diffuser is constant without depending upon angular distribution of incident light and is determined solely by luminous flux incident upon a unit area of the perfect diffuser, i.e., illuminance. Accordingly, in order to make the luminance constant, such a condition that illuminance of light incident upon the diffusing plate is made constant should be created. As shown in FIG. 4, light reflected by the reflective surface 20A illuminates the wedgelike hatching portion H. By equation (1) referred to earlier, the vertical angle $\theta$ of the hatching portion H is equal to $2 \sin^{-1}(R/D)$. If the pitch p of the reflective surface 20A is small as compared with the radius R of the light source 1 and the reflective surface 20A and the diffusing surface are spaced a predetermined distance or more away from each other, the hatching portions H illuminated by the adjoining reflective surfaces 20A overlap each other. Degree of the overlap becomes more conspicuous as the vertical angle $\theta$ of the hatching portion H is increased. When a point on the diffusing plate is taken into consideration, the point is illuminated by light from a greater number of the reflective surfaces 20A as the vertical angle $\theta$ of the hatching portion H is increased. Since illuminance on the diffusing plate is approximately proportional to the vertical angle $\theta$ and the vertical angle $\theta$ is substantially inversely proportional to the distance D, illuminance on the diffusing plate becomes substantially constant at any location of the diffusing plate when the value (a/b) is made proportional to the distance D. One example of the reflective surfaces obtained by calculating according to such criteria is shown in FIG. 6.

Meanwhile, a fact that a distance between the reflective surfaces and the diffusing plate varies according to their locations is not require to be taken into consideration for the following reason. Namely, as the distance between the reflective surfaces and the diffusing plate is increased, illuminance on the diffusing plate, which is based on light from each of the reflective surfaces 20A, decreases but the number of the reflective surfaces illuminating one point on the diffusing plate increases, whereby these two effects counteract each other.

Figure 7:
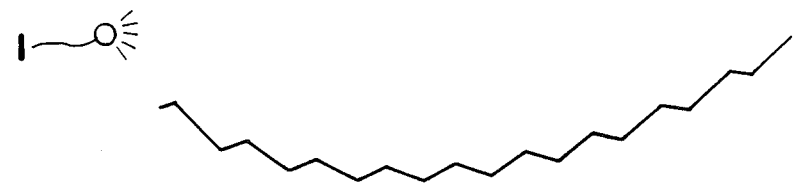

In the forgoing, a case in which the diffusing plate can be regarded as the perfect diffuser has been described. However, it was found by the present inventors that even in the case where a diffusing plate having an intermediate diffusing power is employed, an excellent result can be obtained by varying the dimensions on the condition that the value of (a/p) is linear to the distance D. For example, FIG. 7 shows another example of the reflective surfaces in which the value (a/p) is set at 0.6 and 0.3 at a far end and a near end of the reflective surface relative to the light source, respectively and a portion between the opposite ends of the reflective surface is interpolated linearly. Meanwhile, the pitch p is not required to be constant over the overall area of the reflective surfaces as far as the value of (a/p) is set at a predetermined value satisfying the above described condition. In FIGS. 6 and 7, the pitch p is enlarged in illustration to enable clear understanding.

Figure 8:
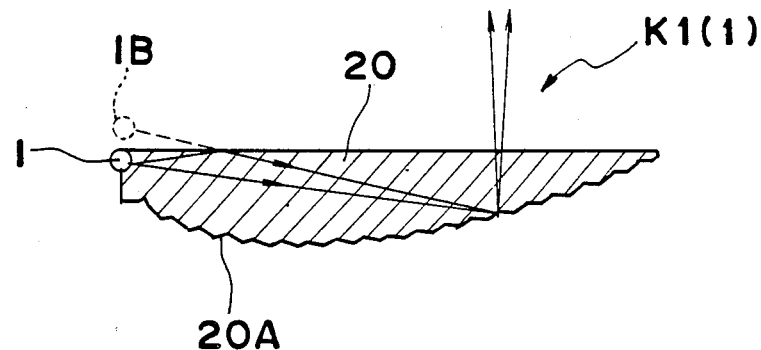
FIGS. 8 and 9 are cross-sectional views of two examples of the lighting apparatus according to the first embodiment of the present invention, respectively.
Figure 9:
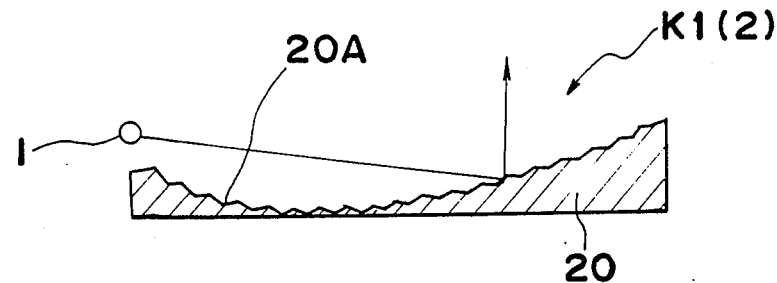

In the first embodiment of the present invention, there are provided two examples K1(1) and K1(2) of a lighting apparatus as shown in FIGS. 8 and 9, respectively. In the lighting apparatus K1(1) of FIG. 8, transparent plastic is molded into the light guide 20 such that light is reflected in the transparent plastic. When an incident angle of light incident upon the reflective surface 20A is larger than the critical angle, the light is subjected to total reflection on the reflective surface 20A. On the contrary, when an incident angle of light incident upon the reflective surface 20A is not more than the critical angle, a portion of the light passes through the reflective surface 20A and thus, a reflective layer made of a metal or the like is provided on the reflective surface 20A. Light from the light source 1 is subjected to total reflection on the upper face of the light guide 20 and a mirror image 1B is formed at the position shown in FIG. 8. Thus, in the lighting apparatus K1(1), twice as much can be utilized than that of the lighting apparatus K1(2) of Fig.9.

Meanwhile, in the lighting apparatus K1(2) of FIG. 9, the light guide 20 is a molded item such that light is reflected on an outer face of the molded item. Thus, it is not necessary to restrict the molded item to specific reflective layer is provided on the other face of the light guide 20.

Hereinbelow, a second embodiment of the present invention will be described with reference to FIGS. 13 to 19. In the second embodiment of the present invention, the value of (a/p) is set so as to be constant. Examples of reflective surfaces 20A of a light guide 20 having a thickness t and employed in the second embodiment of the present invention are shown in FIGS. 13 to 17 when the ratio of (a/b) is variously changed. In FIGS. 13 to 16, the ratio of (a/b) is set at (20/80), (40/60), (60/40) and (80/20), respectively. Meanwhile, in FIG. 17, the length b is set at zero. Meanwhile, the value of each of the lengths a and b is not necessarily required to be constant over an overall area of the light guide 20 so far as the ratio of (a/b) is constant. If the lengths a and b are reduced so as to make the bright and dark stripes smaller in width, the light guide 20 will appear uniform to human eyes. However, in the case where the display panel is of a periodic construction such as an X-Y matrix, etc. and produces moiré fringes making it difficult to watch the display panel clearly, a diffusing plate is provided between the light guide and the display panel.

Figure 18:
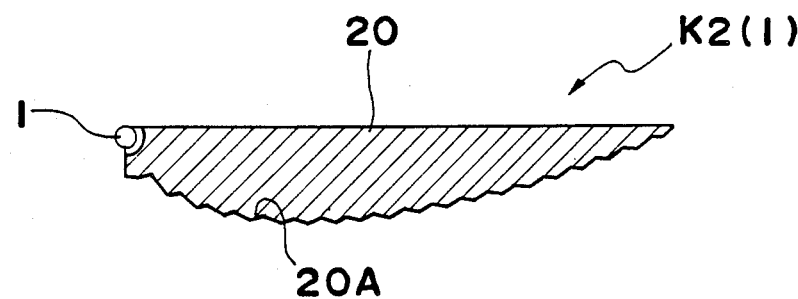
FIGS. 18 and 19 are views similar to FIGS. 8 and 9, respectively, particularly showing the second embodiment of the present invention.
Figure 19:
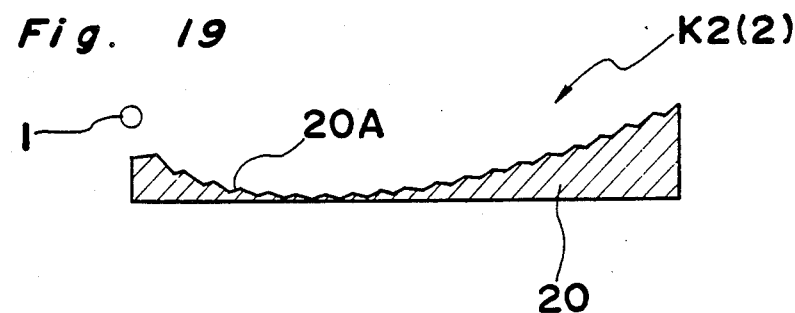

In the second embodiment of the present invention, there are provided two examples K2(1) and K2(2) of a lighting apparatus as shown in FIGS. 18 and 19, respectively. In the lighting apparatus K2(1) of FIG. 18, transparent plastic is molded into the light guide 20 such that light is reflected in the transparent plastic. When an incident angle of light incident upon the reflective surface 20A is larger than the critical angle, the light is subjected to total reflection on the reflective surface 20A. On the contrary, when an incident angle of light incident upon the reflective surface 20A is not more than the critical angle, a portion of the light passes through the reflective surface 20A and thus, a reflective layer made of a metal or the like is provided on the reflective surface 20A.

Meanwhile, in the lighting apparatus K2(2) of FIG. 19, the light guide 20 is a molded item such that light is reflected on an outer face of the light guide 20. Thus, it is not necessary to restrict the molded item to specific materials. When reflectance of the light guide 20 is low, a reflective layer is provided on the outer face of the light guide 20.

The lighting apparatus of the present invention is arranged as described above. Accordingly, in accordance with the present invention, it becomes possible to obtain the thin lighting apparatus provided with the thin light guide having uniform luminance, by which non-uniform illumination is least performed.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a lighting apparatus including a tubular light source having a longitudinal axis and a member having a plurality of reflective surfaces for reflecting light from said light source, the improvement comprising:
   a plurality of other surfaces;
   said reflective surfaces being angularly arranged such that between each said reflective surface a said other surface is provided, said reflective surfaces and said other surfaces alternating to form a continuous element of said member, said reflective surfaces having an adjacent other surface associated therewith to form a pair of surfaces, said reflective and other surfaces having a major dimension parallel to the longitudinal axis of the tubular light source, said reflective surfaces being arranged such that light from said light source is reflected in a predetermined direction by each of said reflective surfaces; and
   a passive display unit disposed in front of said member said display unit lying in a plane;
   each said pair of surfaces having an end-to-end distance measured along a selected parallel to said plane of said display unit;
   each of said reflective surfaces having an end-to-end width measured along said selected parallel to said plane of said display unit;
   a ratio of said end-to-end width of said reflective surfaces to said end-to-end distance being selected to be a function of a distance between said light source and each of said reflective surfaces.

2. A lighting apparatus as claimed in claim 1, wherein said function is a linear function.

3. A lighting apparatus as claimed in claim 2, wherein said ratio of said end-to-end width to said end-to-end distance is proportional to said distance.

4. A lighting apparatus as claimed in claim 3, wherein said member is a molded item.

5. A lighting apparatus as claimed in claim 4, wherein said molded item is made of transparent plastic.

6. In a lighting apparatus including a tubular light source having a longitudinal axis and a member having a plurality of reflective surfaces, the improvement comprising:
   a plurality of other surfaces;
   said reflective surfaces being angularly arranged such that between each said reflective surface a said other surface is provided, said reflective surfaces and said other surfaces alternating to form a continuous element of said member, said reflective surface having an adjacent other surface associated therewith to form a pair of surfaces, said reflective and other surfaces having a major dimension parallel to the longitudinal axis of the tubular light source said reflective surfaces being arranged such that light from said light source is reflected in a predetermined direction by each of said reflective surfaces; and a passive display unit disposed in front of said member, said display unit lying in a plane;

each said pair of surfaces having an end-to-end distance measured along a selected parallel to said plane of said display unit;

each of said reflective surfaces having an end-to-end width measured along said selected parallel to said plane of said display unit;

a ratio of said end-to-end width of said reflective surfaces to said end-to-end distance being selected to be constant.

7. A lighting apparatus as claimed in claim 6, wherein said member is a molded item.

8. A lighting apparatus as claimed in claim 7, wherein said molded item is made of transparent plastic.

9. A light apparatus for illuminating a passive display device, set passive display device having a substantially planar back surface coplaner with a display plane of view comprising:

light emitting means for generating light to supply said display, said light emitting means principally extending along a longitudal axis; and light distribution means for substantially uniformly distributing said light to said planar back surface of said display, said light distribution means including;

a plurality of reflective surfaces, a plurality of other surfaces alternately arranged with said reflective surfaces, each of said surfaces having a first major dimension parallel to said longitudinal axis of said light source means and a second dimension perpendicular to said first major dimension, said second dimension of each said surface, when projected onto said display plane, forming a projected second dimensions, a ratio of the projected second dimension of each said reflected surface to the sum of the projected second dimension thereof and the projected second dimension of an adjacent said other surface being a function of a distance between said reflective surface and said light emitting means.

10. A light apparatus for illuminating a passive display device, set passive display device having a substantially planer back surface coplaner with a display plane of view comprising:

light emitting means for generating light to supply said display, said light emitting means principally extending along a longitudal axis; and light distribution means for substantially uniformly distributing said light to said planer back surface of said display, said light distribution means including;

a plurality of reflective surfaces, a plurality of other surfaces alternately arranged with said reflective surfaces, each of said surfaces having a first major dimension parallel to said longitudinal axis of said light source means and a second dimension perpendicular to said first major dimension, said second dimension of each said surface, when projected onto said display plane, forming a projected second dimension, a ratio of the projected second dimension of each said reflected surface to the sum of the projected second dimension thereof and the projected second dimension of an adjacent said other surface being set as to be constant.

* * * * *